United States Patent Office 3,438,959
Patented Apr. 15, 1969

3,438,959
LIGNOSULFONATE DERIVATIVE AND A PROCESS FOR ITS PREPARATION
Chung Sul Youn Kim, Bellingham, Wash., assignor to Georgia-Pacific Corporation, Portland, Oreg., a corporation of Georgia
No Drawing. Filed Oct. 1, 1965, Ser. No. 492,262
Int. Cl. C07g 1/00; C11d 1/30
U.S. Cl. 260—124                     20 Claims

ABSTRACT OF THE DISCLOSURE

The preparation of a halogenated lignosulfonate by the reaction of lignosulfonate with thionyl chloride or thionyl bromide under substantially anhydrous conditions.

---

This invention relates to a derivative of lignosulfonate and particularly to a halogen containing derivative of lignosulfonate and a process for its preparation.

Lignin is a polymeric substance found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp with lignin being obtained as a by-product. Since vegetable and plant tissues can contain up to about 30% lignin, large amounts of lignin are available. Considerable effort has been expended in lignin research without too much success in the development of methods or processes to utilize more fully the chemical values of lignin. Lignin and lignosulfonates have found only limited markets resulting in an appreciable amount of the pulping liquors having to be processed mainly for disposal purposes rather than for recovery of any chemical values.

It is therefore an object of this invention to provide a process for the treatment of residual pulping liquors or lignin so that the chemical value of the product can be utilized. A further object is to provide a lignin derivative product which is reactive and can be used as an intermediate in the formation of other chemical products.

The above and other objects are attained by interacting sulfonated lignin with a thionyl halide selected from the group consisting of thionyl chloride and thionyl bromide. The interaction of the sulfonated lignin with the thionyl halide will result in the formation of a halogen containing derivative which is reactive and may be reacted with other chemicals to form different products. For example, the intermediate product may be interacted with an alcoholate or a phenolate to form esters or with an amine to form lignosulfonamides.

It is essential that the lignin be sulfonated prior to reaction with the thionyl halide. In some of the pulping processes, for example, the sulfite pulping process, the residual pulping liquor is a sulfonated product containing the lignin in a sulfonated form. In other processes, the residual pulping liquor or the lignin-containing product as obtained from the process may not be a sulfonated product. However, the residual liquors or products containing the lignin portion may be sulfonated by various known methods to the degree desired by reaction, for example, with a bisulfite or sulfite, including further sulfonation of a sulfite pulping liquor. Residual pulping liquors obtained in the Kraft and other alkaline processes of digestion of lignocellulosic materials, "hydrolysis lignin" obtained by the hydrolysis of lignocellulosic materials in the manufacture of wood sugars, "hydrotropic lignins" derived from hydrotropic pulping processes, or lignin obtained from any source may thus be sulfonated and used in the formation of the reactive halogenated lignosulfonate derivative. Also, lignosulfonates or residual pulping liquors which have been altered somewhat by further processing or treatment such as an acid treatment, alkaline treatment, heat treatment, oxidation with acids as well as other oxidizing agents, and other treatments are operative as long as the lignin constituents retain their basic phenylpropane polymeric structure to have the general porperties and characteristics associated with the lignin products.

In the separation of lignin from the lignocellulosic materials, other constituents besides lignin are generally obtained in the lignin-containing product. For example, spent sulfite liquor generally contains about 40 to 60 weight percent of lignosulfonate with the remainder being carbohydrates and other organic and inorganic materials dissolved in the liquor. Lignin products obtained by other processes will likewise contain other materials such as carbohydrates, degradation products of carbohydrates, and resinous materials which may remain after sulfonation of the lignin products obtained by such processes. Most of the non-lignin constituents such as sugars may not be detrimental but will result in the utilization of the thionyl halide by reacting with the reagent. Thus, generally the lignosulfonate constituents are separated from the non-lignin products prior to reaction with the acid halide. Lignin products such as a sulfonated residual pulping liquor may be subjected to different treatments, such as, for example, acid, alkaline or heat treatments as well as reaction with other chemicals or oxidation to remove or modify some of the non-lignin constituents or for other purposes. The lignin constituents may be affected to a certain extent by such treatments but this is not detrimental as long as the treatment is not so severe as to destroy the basic phenylpropane polymeric structure of the lignin and properties characteristic of these products. For example, a spent sulfite liquor may be oxidized as in the preparation of vanillin. The vanillin raffinate obtained will generally contain lignosulfonates which may be altered somewhat but which still retain the basic properties and characteristics associated with lignosulfonates. It is generally preferred to recover the lignosulfonates from the lignin products by solvent extraction or by precipitation with an alkaline earth hydroxide, an acid, or an amine. Other known methods, however, may also be used, some of which are ion exchange, dialysis and electrodialysis.

In addition to recovery of the lignosulfonates, the recovered lignosulfonates may be further treated to reduce the average molecular weight of the product. The lignosulfonate having average molecular weights in the range such that the diffusion coefficient is in the range of 14 to 20 mm.$^2$/day (as determined by the agar gel method described in J. Am. Chem. Soc. vol. 81, 2054 by J. Moacanin et al.) result in the preparation of a more reactive intermediate product. If desired, the lignosulfonate product may be fractionated to recover the low molecular weight fraction. However, it is generally preferred to treat the lignosulfonate obtained to reduce the average molecular weight. This may be done by using the various known methods, for example, prehalogenation of the lignosulfonate or resulfonation under conditions to obtain reduced molecular weight. In the prehalogenation, halogen gases such as chlorine or bromine may be used or other halogenating agents employed which result in the formation of elemental bromine or chlorine under the treatment conditions. In addition to just reducing the molecular weight, the prehalogenation results in halogenating the sulfonated lignin which has an advantageous effect in making the product react more rapidly and efficiently with the thionyl halide. Halogen substitution on the aromatic groups of the lignin is most likely obtained by the prehalogenation resulting in the improved properties.

The reaction of the lignosulfonate with the thionyl halide is carried out in a non-aqueous medium preferably under substantially anhydrous conditions and in a medium in which the particular lignosulfonate is soluble. Thionyl chloride is generally used in the reaction due to its availability. Thionyl chloride is a good solvent for many lignosulfonates and thus may be used also as a reaction medium.

It is not necessary that the conditions be absolutely anhydrous, since any water present will react with the thionyl halide to form a hydrogen halide and sulfur dioxide until the system becomes substantially anhydrous. Preferably, the reaction is carried out under reflux so that the acids or any other gaseous reaction products will be expelled from the system. A low boiling solvent or medium is generally preferred to permit the reaction mixture to be refluxed at temperatures below the decomposition point of the thionyl halide without having to employ reduced pressures.

The lignosulfonate must be at least partially soluble in the solvent to effect the reaction with the thionyl halide. Since there are relatively few non-aqueous solvents, such as, for example, dimethyl sulfoxide, which will dissolve metal salts of lignosulfonate, the lignosulfonate is generally converted to the acid form of an amine salt for which more readily available solvents such as dioxane, tetrahydrofuran, halogenated alkanes such as chloroform and halogenated aromatics as chlorinated benzene may be used in addition to an excess of the thionyl halide. The term "lignosulfonate," as used herein, means lignosulfonate in its acid form as well as salts thereof.

Since a common method of recovering lignosulfonates from a sulfonated lignin-containing material or pulping liquor is by precipitation or solvent extraction of the sulfonated lignin as an amine salt, the amine salts of lignosulfonate are preferably used for the reaction with the thionyl halide. The formation of the amine salt is usually obtained by the addition of an amine to a lignosulfonate-containing aqueous solution which, under acid conditions, will result in the precipitation of the lignosulfonate amine salt. A primary, secondary or tertiary amine may be used. The amine may be an alkyl amine having from 3 to 30 carbon atoms or an aryl amine of about the same number of carbon atoms. The alkyl radicals or substituents can be either saturated or unsaturated as well as cyclic. Generally, it is preferred to have an amine of at least 8 carbon atoms so that the solubility of the amine lignosulfonate salt in water is sufficiently low to precipitate more readily from the solution. Illustrative examples of the amines which may be used are triamylamine, fatty amines, dioctylamine and octylaniline.

While the thionyl halide will react with the sulfonated lignin at room temperature, it is generally preferred to heat the reaction medium to a temperature in the range of from 50° C. to 70° C. or up to the decomposition point of the thionyl halide. The rate of reaction of thionyl halide with the sulfonated lignin is rapid, increasing appreciably with an increase in temperature. At the preferred temperature of 50° C. to 70° C., generally a reaction time of 2 to 4 hours is used. However, a reaction time of from 5 or 10 minutes to 24 hours may be employed. After the reaction, the solvent or excess reactant such as thionyl chloride, if used as a reaction medium, is evaporated with other volatiles which may have been formed. The intermediate product of the invention after the evaporation of the solvent is a dark brown powder. The product may be stored under anhydrous conditions preferably at a low temperature. While the dry product is relatively stable, it may undergo some condensation if stored for a considerable length of time. The intermediate product slowly dissolves in aqueous alkaline solutions and is soluble in chloroform, acetone, ethanol and insoluble in water.

The ratio of the thionyl halide intermixed with the lignosulfonate may be widely varied. Generally, it is preferred to use sufficient amount of the thionyl halide to react with at least 50% of the sulfonate radicals present in the lignosulfonate, preferably from at least about 80% to the stoichiometric amount to react with the sulfonate radicals. Since the lignosulfonates as recovered may contain moisture and other constituents, even though purified, which may utilize some of the thionyl halide, a 10% to 20% stoichiometric excess or more is often used. With a large excess of the thionyl halide, such as when the thionyl halide is used as the reaction medium, additional halogen substitution in the lignin molecules may be obtained, especially at the higher reaction temperature. At reaction temperatures above 50° C. and with excess thionyl halide present, an increase in the halogen content and a decrease in the hydroxy content in the product are generally obtained indicating that some halogen substitution of the hydroxy groups may have taken place.

The following examples further illustrate the invention and the properties of the intermediate product obtained.

EXAMPLE I

A lignosulfonate intermediate or derivative was prepared from a fermented calcium base spent sulfite liquor. The liquor was fermented to convert the fermentable sugars to alcohol and stripped to recover the alcohol. The alcohol-free liquor was then concentrated and adjusted to a pH of 0–3 and triamylamine added to precipitate the lignosulfonate as a triamylamine salt. The salt thus obtained was washed with water and dried.

Triamylamine lignosulfonate in an amount of 70 g. was added to a solution containing 150 g. of thionyl chloride and 150 ml. of chloroform, while stirring, and the resulting reaction mixture was refluxed for 3 hours. The solvent, the unreacted thionyl chloride and other volatiles were then flashed off under vacuum. A portion of the resulting intermediate product was washed with water 3 times and analyzed. The product was a brown powder.

The analysis and properties of the intermediate product as compared to lignosulfonic acid are shown below:

|  | Lignosulfonic acid | Intermediate product |
| --- | --- | --- |
| Percent Cl | 0.0 | 11.0 |
| Percent S | 5.4 | 6.3 |
| Percent N | 0.0 | 1.5 |
| I.R. | (¹) |  |

¹ New peaks at 7.4 and 8.4 $\mu$ and intensity of —OH peaks of lignosulfonic acid is decreased by about one-half.

SOLUBILITIES

| Acetone | Very sparingly soluble. | Very soluble. |
| --- | --- | --- |
| Chloroform | Insoluble | Slightly soluble. |
| Water | Soluble | Insoluble. |
| 10% aqueous NaOH solution. | do | Slowly goes into solution upon heating. |

The nitrogen content in the intermediate product was believed to be in the form of triamylammonium sulfate and triamylammonium chloride which were not completely removed from the product by washing.

EXAMPLE II

A spray dried fermented calcium base spent sulfite liquor in an amount of 300 g. was dispersed in 1500 ml. of methanol and 100 g. of $Cl_2$ were bubbled into the resulting dispersion at 10° C. The methanol and the HCl formed in the chlorination were evaporated off at room temperature. The chlorinated lignosulfonate constituents were recovered from the chlorinated spent sulfite liquor by the selective solubility of the triamylamine lignosulfonate salt in butanol. The chlorinated spent sulfite liquor solids, free of methanol, were dispersed in a mixture of butanol and water and triamylamine was added to the mixture until a pH of about 5 was obtained.

The butanol phase, containing most of the triamylamine salt of chlorinated lignosulfonate formed by the addition of the triamylamine, was washed with water three times to remove the carbohydrates and other non-lignin constituents. The alcohol was evaporated and the vacuum dried product was washed two times with diethyl ether and once with petroleum ether to remove the excess amine and residual butanol.

The dry triamylamine salt of chlorinated lignosulfonate in an amount of 90 g. was dissolved in 600 ml. of chloroform and 42 g. of thionyl chloride were added with stirring at room temperature. The resulting reaction mixture was refluxed for 3 hours after which the solvent and the volatiles were flashed off under the vacuum. The intermediate as a viscous residue was obtained which was redissolved in 200 ml. of chloroform, stirred for 10 minutes and the chloroform was flashed off.

A portion of the product was further purified by dissolving the product in a minimum amount of acetone and pouring the solutions into water to precipitate the intermediate. The precipitation was washed three times with water and dried at 40° C. to 45° C. under vacuum. The resulting intermediate product was a brown powder weighing 21 g. and had the following analysis and properties:

|  | Triamylamine salt of chlorinated lignosulfonates | Intermediate product |
| --- | --- | --- |
| Percent N | 1.6 | 1.2 |
| Percent Cl, organic | 9.6 | 12.8 |
| Percent Cl, inorganic | 0.3 | 0.7 |
| Percent sulfonate S | 3.5 | 3.6 |
| Percent nonsulfonate S | 0.5 | 1.8 |
| Percent methoxyl | 7.1 | 7.8 |
| I.R. |  | (¹) |

¹ New peaks at 7.4 and 8.4 μ which correspond with those of sulfonyl chloride.

SOLUBILITIES

| Acetone | Soluble | Very soluble. |
| --- | --- | --- |
| Chloroform | do | Swells or slightly soluble. |
| Ethanol | do | Soluble. |
| Water | Insoluble | Insoluble. |

EXAMPLE III

A fermented calcium base spent sulfite liquor was chlorinated in a manner similar to that described in Example II except that 110 g. of chlorine were used per 100 g. of spray dried solids and that after evaporation of the methanol and the hydrogen chloride formed as a result of the chlorination, the chlorinated lignosulfonate was dissolved in a 5% sodium hydroxide solution and allowed to remain at 80° C. overnight. The pH of the solution during this time was kept above 12.

The chlorinated lignosulfonate constituents were recovered from the sodium hydroxide treated solution as the triamylamine salt by the addition of triamylamine with hydrochloric acid. The triamylamine salt formed was extracted from the solution with chloroform. The chloroform was evaporated and the residue was dissolved in a minimum amount of acetone and the resulting solution was slowly poured into water with agitation to precipitate the triamylamine salt of the chlorinated lignosulfonate. The product was washed with water and dried.

To 40 g. of the triamylamine salt of the chlorinated lignosulfonate dissolved in 400 ml. of chloroform, 40 g. of thionyl chloride were added slowly. The reaction mixture was refluxed for 3 hours after which the solvent and the volatiles were flashed off under vacuum. The intermediate product obtained as the residue was used in the preparation of N-dodecylchlorolignosulfonamide. The intermediate product was dissolved in chloroform and 60 g. of dodecylamine likewise dissolved in chloroform was slowly added with stirring. The resulting homogeneous mixture was stirred for 3 hours at 50° C. while the pH of the system was maintained at about 9 by addition of amine.

The resulting N-dodecylchlorolignosulfonamide was recovered from the reaction mixture by the evaporation of the chloroform and washing with acidic acetone-water mixture to remove the excess amine. The chlorolignosulfonamide obtained was a semi-solid product which weighed 41 g. after vacuum drying.

To illustrate the surface active properties of the chlorolignosulfonamide, it was tested as water-in-oil emulsifier. Ten grams of the chlorolignosulfonamide prepared above were mixed with 200 ml. of diesel oil and about 4 g. of a 25 weight percent sodium hydroxide solution. To the mixture, 150 ml. of saturated salt brine were added and the mixture continually mixed for 30 minutes. The stability of the emulsion system was tested by the addition of more saturated brine under the continual mixing until a phase conversion or coagulation of the water-in-oil emulsion was obtained. Seventeen hundred milliliters of the saturated brine were added before the phase conversion or coagulation occurred. An emulsifier which will permit addition of more than 1000 ml. before the phase conversion is generally considered a good emulsifier.

What is claimed is:

1. A composition comprising a lignosulfonate reacted under substantially anhydrous conditions with a thionyl halide selected from the group consisting of thionyl chloride and thionyl bromide, said lignosulfonate being reacted with the thionyl halide at a temperature in the range of from room temperature to the thermal decomposition temperature of the thionyl halide.

2. A composition according to claim 1 wherein the thionyl halide is thionyl chloride.

3. A composition according to claim 1 wherein the thionyl halide is thionyl bromide.

4. A composition according to claim 1 wherein the lignosulfonate and thionyl halide are reacted in a medium selected from the group consisting of an excess of the thionyl halide, chloroform, benzene, tetrahydrofuran, dioxane and mixtures thereof.

5. A composition according to claim 4 wherein the lignosulfonate is a fraction of a spent sulfite liquor having an average molecular weight such that its diffusion coefficient is in the range of 14 to 20 mm.²/day.

6. A composition comprising a lignosulfonate reacted with a halogen having an atomic number in the range of 17 to 35 and subsequently reacted under substantially anhydrous conditions with a thionyl halide selected from the group consisting of thionyl chloride and thionyl bromide, said halogen-reacted lignosulfonate being reacted with the thionyl halide at a temperature in the range of from room temperature to the thermal decomposition temperature of the thionyl halide.

7. A composition according to claim 6 wherein the halogen is chlorine and the thionyl halide is thionyl chloride.

8. A process for the preparation of a halogenated lignosulfonate which comprises intermixing under substantially anhydrous conditions lignosulfonate with a thionyl halide selected from the group consisting of thionyl chloride and thionyl bromide, said lignosulfonate being intermixed with the thionyl halide at a temperature in the range of from room temperature to the thermal decomposition temperature of the thionyl halide.

9. A process according to claim 8 wherein the lignosulfonate is a lignosulfonate fraction from a spent sulfite liquor, intermixed with thionyl chloride at a temperature in the range of 50° to 70° C.

10. A process for the preparation of a halogenated lignosulfonate, which comprises sulfonating a lignin-containing material to thereby convert the lignin to a lignosulfonate, separating the lignosulfonate from the reaction mixture and intermixing under substantially anhydrous conditions the lignosulfonate with thionyl halide selected from the group consisting of thionyl chloride and thionyl bromide, said lignosulfonate being intermixed with the thionyl halide at a temperature in the range of from room temperature to the thermal decomposition temperature of the thionyl halide.

11. A process according to claim 10 wherein the thionyl halide and lignosulfonate are intermixed in an inert non-aqueous solvent wherein said lignosulfonate and said thionyl halide are at least partially soluble.

12. A process according to claim 10 wherein the lignosulfonate is separated from the sulfonated lignin-containing material by intermixing the sulfonated lignin-containing material with an organic amine, having from 3 to 30 carbon atoms selected from the group consisting of primary, secondary, and tertiary amines to thereby recover the sulfonated lignin as an amine salt.

13. A process according to claim 10 wherein the lignosulfonate and thionyl halide are intermixed in a solvent selected from the group consisting of chloroform, benzene, dioxane, tetrahydrofuran, and an excess of the thionyl halide.

14. A process according to claim 13 wherein the sulfonated lignin-containing material is a spent sulfite liquor.

15. A process according to claim 13 wherein the thionyl halide is thionyl chloride.

16. A process for the preparation of a halogenated lignosulfonate from a sulfonated residual pulping liquor, which comprises separating the lignosulfonates from the residual pulping liquor, contacting the lignosulfonates with a halogen having an atomic number in the range of 17 to 35 to prehalogenate the lignosulfonates, and reacting under substantially anhydrous conditions the prehalogenated lignosulfonates with a thionyl halide selected from the group consisting of thionyl chloride and thionyl bromide, said prehalogenated lignosulfonate being reacted with the thionyl halide at a temperature in the range of from room temperature to the thermal decomposition of the thionyl halide.

17. A process according to claim 16 wherein the halogen is chlorine and the thionyl halide is thionyl chloride.

18. A process according to claim 17 wherein the sulfonated residual pulping liquor is a spent sulfite liquor and the lignosulfonates are separated by precipitation of the lignosulfonates as an alkyl amine salt.

19. A process according to claim 17 wherein the prehalogenated lignosulfonate and thionyl chloride are intermixed in a non-aqueous inert solvent wherein the prehalogenated lignosulfonate and the thionyl halide are at least partially soluble.

20. A process according to claim 17 wherein the prehalogenated lignosulfonate and thionyl chloride are intermixed in a non-aqueous solvent selected from the group consisting of chloroform, dioxane, tetrahydrofuran, benzene, and an excess of thionyl chloride.

References Cited

Brauns: "The Chem. Lignin," 1952, p. 324.

Brauns et al.: "Chem. of Lignin," sup. vol. pp. 291 and 297.

CHARLES B. PARKER, *Primary Examiner.*

D. R. PHILLIPS, *Assistant Examiner.*